US005122172A

United States Patent [19]

Sherwood et al.

[11] Patent Number: 5,122,172

[45] Date of Patent: Jun. 16, 1992

[54] VAPOR CANISTER WITH CARBON LOADING MAINTENANCE

[75] Inventors: Carl H. Sherwood, Brockport; Otto Muller-Girard, Jr., Rochester, both of N.Y.

[73] Assignee: General Motors Corporation, Detroit, Mich.

[21] Appl. No.: 702,481

[22] Filed: May 20, 1991

[51] Int. Cl.[5] ........ B01D 53/04

[52] U.S. Cl. ........ 55/387; 55/475; 123/519

[58] Field of Search ........ 55/179, 316, 387, 389, 55/475; 123/519; 267/155, 156, 275, 277

[56] References Cited

U.S. PATENT DOCUMENTS

| | | | |
|---|---|---|---|
| 2,593,132 | 4/1952 | Gannon | 55/387 |
| 2,798,718 | 7/1957 | Gross | 55/316 X |
| 2,806,244 | 9/1957 | Bernhard | 267/156 X |
| 2,941,415 | 6/1960 | Hawkins | 267/156 X |
| 3,091,447 | 5/1963 | Donkin | 267/156 |
| 3,628,314 | 12/1971 | McCarthy et al. | 55/387 |
| 4,350,662 | 9/1982 | Dowgul et al. | 55/387 X |
| 4,496,379 | 1/1985 | Kozawa | 55/387 |
| 4,635,755 | 1/1987 | Arechaga | 267/156 X |
| 4,766,872 | 8/1988 | Kato et al. | 55/475 X |
| 4,776,574 | 10/1988 | Krambeck | 267/156 |
| 4,921,230 | 5/1990 | Thomsen | 267/156 |

FOREIGN PATENT DOCUMENTS

| | | | |
|---|---|---|---|
| 2304990 | 8/1973 | Fed. Rep. of Germany | 55/387 |
| 55-099318 | 7/1980 | Japan | 55/387 |
| 1-210008 | 8/1989 | Japan | 55/475 |
| 214929 | 8/1941 | Switzerland | 55/475 |
| 1230649 | 5/1986 | U.S.S.R. | 55/387 |

*Primary Examiner*—Robert Spitzer

*Attorney, Agent, or Firm*—Patrick M. Griffin

[57] ABSTRACT

A vapor storage canister has an improved carbon bed loading pressure maintenance mechanism. A pressure plate is driven up indirectly, through a threaded shaft turned by a radially wound spiral spring, rather than by an axially compressed helical spring. This takes better advantage of the space available between the carbon bed and the lower end of the canister.

3 Claims, 2 Drawing Sheets

VAPOR CANISTER WITH CARBON LOADING MAINTENANCE

This invention relates to automotive fuel vapor canisters in general, and specifically to such a canister with an improved mechanism for maintaining the loading pressure in the adsorbent bed.

BACKGROUND OF THE INVENTION

Automotive fuel vapor canister typically have a bed of activated carbon granules that substantially fills the canister housing, adsorbing and later releasing to the engine excess fuel vapor that would otherwise have been vented. The volume of the carbon bed may decrease relative to the volume of the canister housing over time. This decrease in the relative volume ratio may occur as the result of environmental expansion of the canister housing itself, or as a result of the carbon granules becoming more densely packed, or both. Either effect may cause the carbon bed to become more loosely packed within the housing. The typical mechanism for maintaining loading pressure in the carbon bed is simply a helical compression spring or springs biased directly between a pressure plate and the bottom end cover of the canister. As the volume ratio decreases, the spring or springs expand to move the pressure plate into the carbon bed to maintain it firmly packed.

The inherent characteristics of the canister housing and carbon bed dictate an axial range of motion for the pressure plate, the distance it would have to move in order to stay with the carbon bed. Compression springs have to expand axially over the same range of motion in order to stay with the plate, and have to remain compressed in order to maintain a loading pressure on the carbon bed. Applying a force through a distance means that energy must be stored and released, and a compression spring stores energy by virtue of its axial compression. Equal energy can be provided by compressing longer, weaker springs to a greater degree, or by compressing shorter, stiffer springs to a lesser degree. Limited axial space below the pressure plate may dictate shorter, stiffer springs. However, it is also desirable that the loading pressure provided by the springs stay relatively constant, and compression springs with lower spring rates generally provide a more linear response over a given range of motion. But weaker springs may not store enough energy when compressed within the limited axial space available. Therefore, it may not be possible to optimize all parameters with the conventional, direct acting compression spring design.

SUMMARY OF THE INVENTION

The invention provides an improved mechanism for maintaining the carbon bed loading pressure that works more efficiently within the space available.

In the preferred embodiment disclosed, the canister housing is generally cylindrical, and substantially filled by an adsorbent bed of activated carbon. A space is left between the carbon bed and the bottom cover of the canister that has a radius equal to the canister housing, but its axial height is less than its radius. The volume of the carbon bed relative to the housing can decrease due to the factors described above.

To compensate for the volume ratio decrease, a round pressure plate that moves axially within the housing like a piston in a cylinder is continually biased into the carbon bed by a centrally located threaded shaft. The threaded shaft turns within a threaded journal in a stationary thrust collar. The lower end of the threaded shaft is fixed to a disk that has a radius nearly as large as the canister housing. Below the disk is a spiral torsion spring, one end of which is fixed to the edge of the disk and the other to the bottom cover of the housing. The spiral spring is wound up at the time the canister is assembled, and continually attempts to rotate the disk and shaft up through the thrust collar, forcing the pressure plate into the carbon to pressurize it. Should the carbon bed contract, or the housing expand, the lever arm provided by the disk is large enough so that the spring force creates enough torque to overcome the inherent thread friction and actually turn the shaft. This moves the pressure plate up to maintain loading pressure on the carbon bed.

A spiral spring with a relatively low spring rate can be used, since it acts through the mechanical advantage provided both by the disk and by the thread itself. As noted above, this helps to keep the loading pressure constant through the entire range of motion of the plate. The greater winding and unwinding space that is needed with a lower spring rate is more readily available within the radial space than it would be within the limited axial space below the pressure plate. Should the housing re-contract, the resultant force down on the pressure plate would create a reversal torque on the threaded shaft proportional only to the pitch radius of the threads, not the larger disk radius through which the spring acts on the shaft. This should not be enough to overhaul the shaft. In addition, in the embodiment disclosed, The thrust collar, shaft and pressure plate form a subassembly that can be installed easily when the canister is built up. Also, the bottom cover serves as a winder for the spiral spring.

It is, therefore, a general object of the invention to provide a mechanism for maintaining loading pressure on the carbon bed of a vapor canister that uses the space available within the canister more efficiently.

It is another object of the invention to provide such a mechanism that is suited to using a lower spring rate, so as to provide a more nearly constant loading pressure over the range of motion of the pressure plate.

It is another object of the invention to provide such a mechanism that uses a spiral wound spring, so as to store energy within the larger available radial space below the pressure plate.

It is still another object of the invention to provide such a mechanism in which the spiral spring acts through the mechanical advantage of a screw thread and a disk.

It is yet another object of the invention to provide such a mechanism in which the components cooperate to create an easily installed subassembly.

DESCRIPTION OF THE PREFERRED EMBODIMENT

These and other objects and features of the invention will appear from the following written description, and from the drawings, in which.

Figure 1:
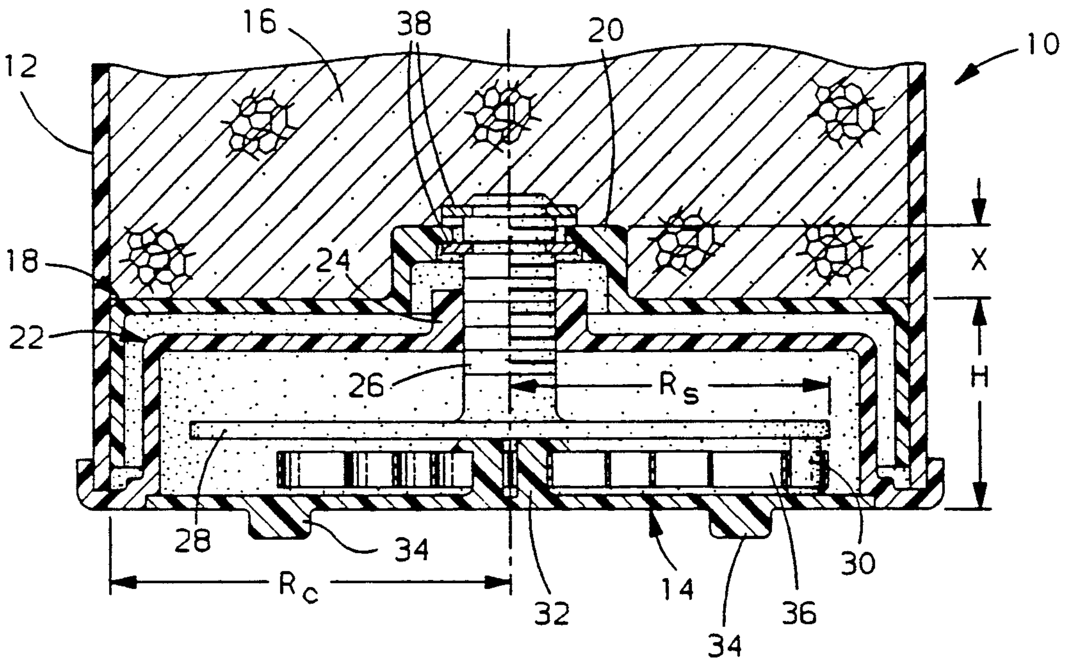
FIG. 1 is a cross sectional view of the lower end of a vapor canister incorporating a preferred embodiment of the improved loading pressure mechanism of the invention, showing the threaded shaft in elevation.
Figure 3:
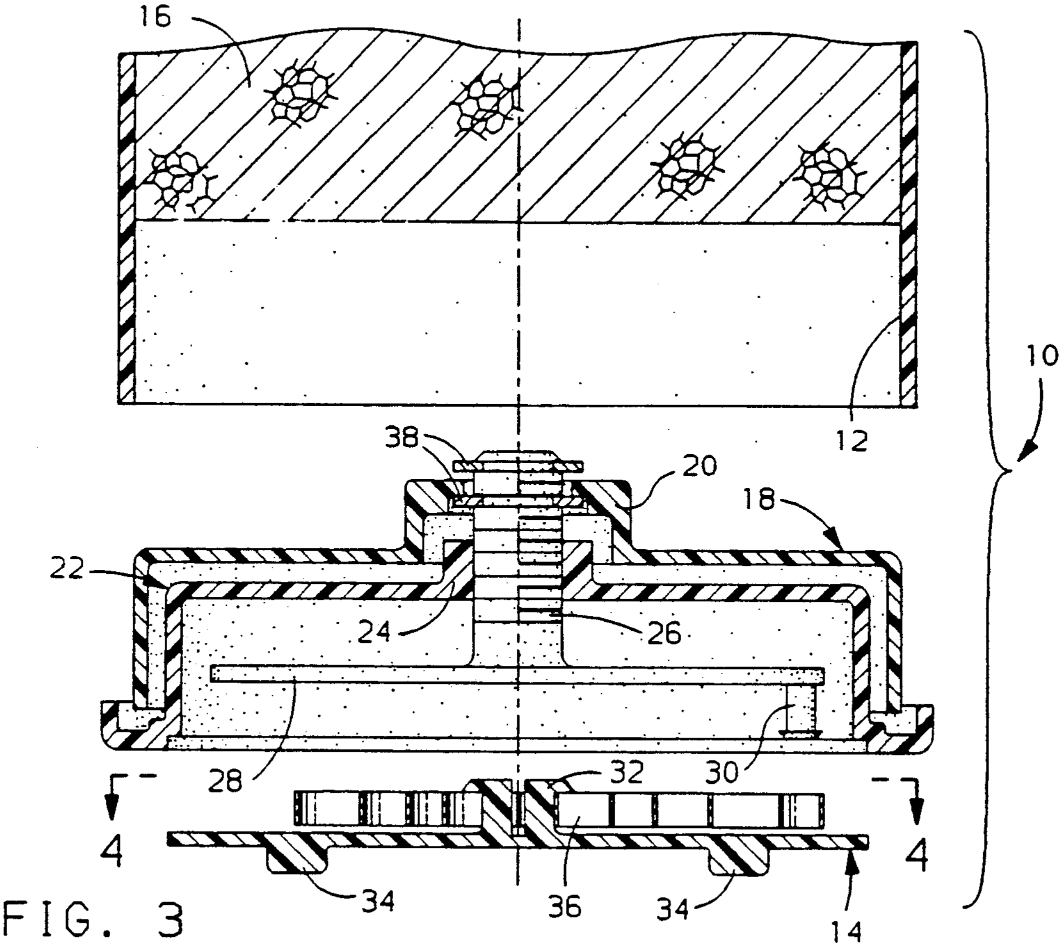
FIG. 3 is a view of the invention being installed in a canister.

Referring first to FIGS. 1 and 3, a fuel vapor storage canister incorporating a preferred embodiment of the invention is indicated generally at 10. Canister 10 includes a cylindrical housing 12, molded of nylon or similar material, with a central axis indicated by the dotted line. Housing 12 has a closed upper end, not illustrated, and an axially opposed lower end that is eventually closed by a circular bottom cover, indicated generally at 14. Housing 12 is filled, but not totally, by an absorbent bed 16 of activated carbon granules. Bed 16 operates most efficiently and lasts longer if its granules are maintained firmly packed inside housing 12. When the packing is maintained, there is an empty space between bed 16 and bottom cover 14 that has a relatively short axial height H, but a radius $R_C$ the same as the canister housing 12. Housing 12 may expand, due to water absorption or thermal expansion, and the basic volume of bed 16 may shrink somewhat, due to closer packing or abrasion of some of the granules. Therefore, a mechanism that will automatically maintain a loading pressure on bed 16, preferably a fairly constant loading pressure, is needed.

Figure 2:
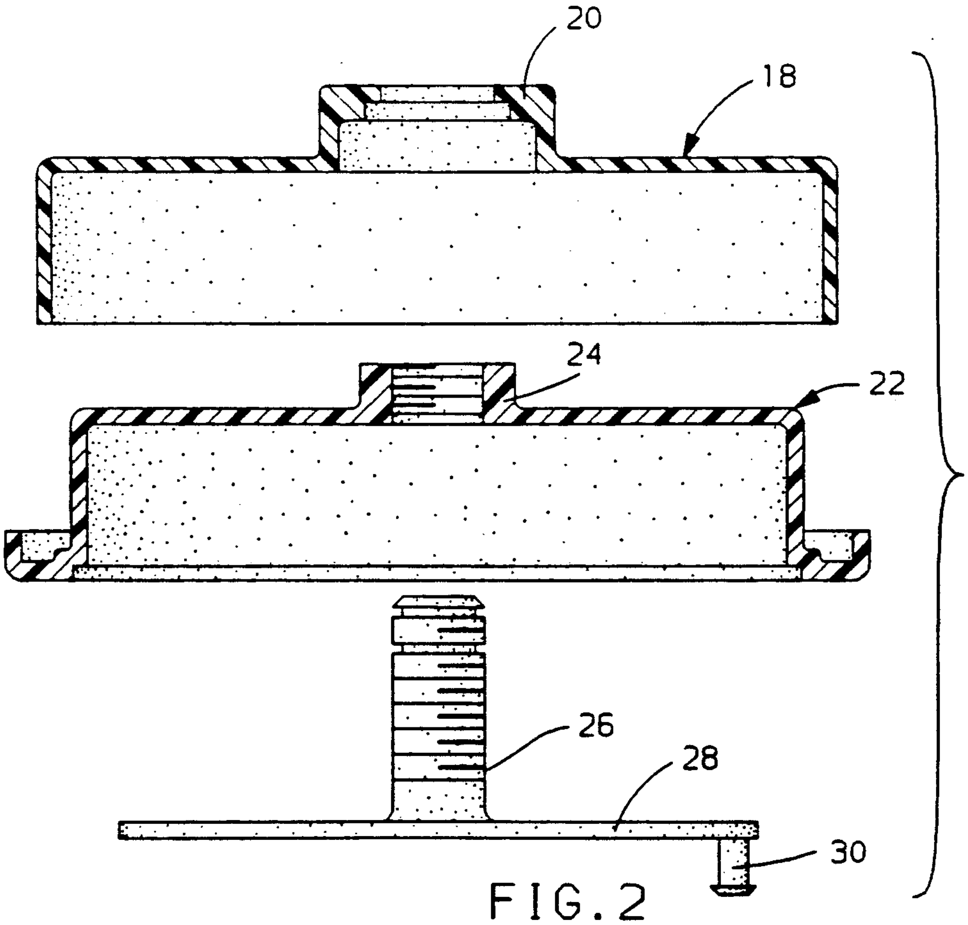
FIG. 2 is an exploded view of some of the components of the invention prior to assembly.

Referring next to FIGS. 2 and 3, the components of such a mechanism are illustrated. A piston shaped pressure plate, indicated generally at 18, has an open central boss 20 coaxial to housing 12, and fits closely, but slidably, within housing 12. A bowl shaped thrust collar, indicated generally at 22, has a central threaded journal 24 coaxial to housing 12, and is sized so as to fit tightly over the lower end of housing 12. A threaded shaft, indicated generally at 26, has a disk 28 fixed to the bottom with a radius $R_S$ just less than $R_C$, with a pin 30 depending from the outer edge of disk 28. Shaft 26 is threaded to fit within journal 24, and would have a helix angle designed to give it a high mechanical thread efficiency. Bottom cover 14 includes a slotted center post 32 on its inner surface and a pair of windup tabs 34 on its outer surface. The final component is a spiral torsion spring 36, the inner end of which fits in post 32 and the out end of which is adapted to snap onto pin 30. As best seen in FIG. 3, pressure plate 18, thrust collar 22, and shaft 26 can be pre-assembled as a unit subassembly. Shaft 26 is first threaded through journal 24. Then, pressure plate 18 is added by trapping boss 20 between a pair of snap rings 38, leaving it spaced from thrust collar 22. The subassembly can be installed as described next.

Figure 4:
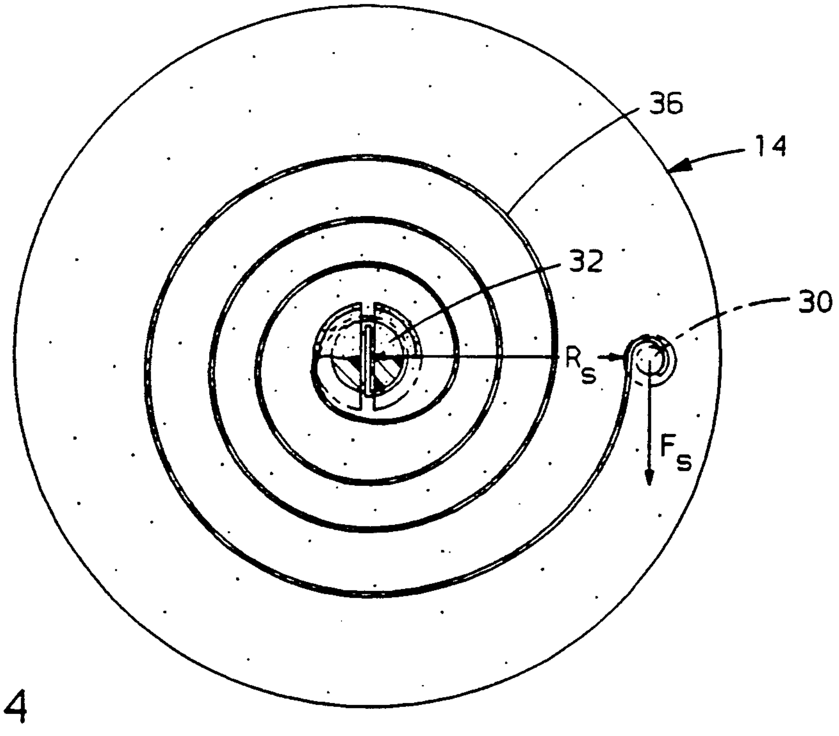
FIG. 4 is a view taken along the line 4—4 of FIG. 3.

Referring next to FIGS. 3 and 4, the assembly of canister 10 is illustrated. First, the carbon bed 16 is poured in place. As a practical matter, this would be done by supporting canister housing 12 upside down and pouring the material in, but it is shown upright to better illustrate the invention. The bed 16 does not completely fill housing 12, as noted above, leaving an empty axial space of height H at the bottom. Then, the subassembly described above is inserted into the still open bottom end of canister housing. The rim of thrust collar 22 is attached solidly to the edge of canister housing 12 by adhesive or sonic welding. Next, the secondary subassembly of bottom cover 14 and spring 36 is moved into place, which seats on the edge of thrust collar 22, and the free end of spring 36 is hooked to pin 30. The lower end of canister housing 12 is closed at that point, but cover 14 is not yet fixed in place. Instead, bottom cover 14 is twisted by the windup tabs 34, counterclockwise from the perspective of FIG. 4, winding up spring 36. Finally, bottom cover 14 is fixed in place as thrust collar 22 was. Spring 36 would be wound up by the number of turns necessary to store the needed energy, depending on the spring rate and other factors noted below. However, it will be noted that energy is stored in the radial space available, which is significantly greater than the axial space available.

Referring next to FIGS. 1 and 4, the operation of the invention is illustrated. Directly after assembly of canister 10, pressure plate 18 sits at the nominal height H. Spring 36, in attempting to unwind, applies a force $F_S$ that is a function of its spring rate and how tightly it has been wound. The force acts through the lever arm $R_S$ of disk 28, applying a torque that attempts to turn shaft 26 through journal 24 and push pressure plate 18 into carbon bed 16. Until the carbon bed/housing 12 volume ratio decreases, pressure plate 18 cannot actually move axially up, or course, but a loading pressure on bed 16 is maintained, and a tighter winding would give a higher pressure. When the volume ratio does decrease, the torque created by spring 36 is sufficient to overcome the inherent thread friction and actually turn shaft 26 within journal 24. This causes pressure plate 18 to move axially up with the carbon bed 16 and maintain the loading pressure. Over time, pressure plate 18 may have to move axially up by as much as the distance X in order to keep the bed 16 packed. The distance X is exaggerated for purposes of illustration, but there will be an expected axial range of motion for pressure plate 18, dependent on environmental conditions and the geometry of housing 12. As this occurs, spring 36 unwinds more, continuing to apply a force $F_S$ that acts through the mechanical advantage of both disk 28 and that supplied by the inclined plane nature of the threading on shaft 26. This maintains a loading pressure on bed 16 continuously.

The application of a force through a mechanical advantage implies the need for a proportionally greater distance of force application in order to do equivalent work. This would be reflected physically in a relatively greater unwinding of spring 36, as contrasted to the direct, axial upward expansion of a conventional compression spring. However, since the spring 36 winds up in the relatively greater available radial space, it stores energy more efficiently than a compression spring. Moreover, the mechanical advantage inherent in the indirect application of force through the disk 28 and the threaded shaft 26 allows the use of a lower rate spring, meaning that it can apply a more nearly constant force and loading pressure over a given range of motion. Another advantage of the invention is the fact that, should the housing 12 recontract, which would tend to force plate 18 back down, the back force would act on shaft 26 through a lever arm only as great as the pitch radius of the thread, far less than the radius of disk 28. Consequently, the torque created should not be enough to back drive shaft 26, which will have the one way action of a jack or power screw.

Variations in the preferred embodiment could be made. Some means other than a direct connection could be used to transfer the spring force to shaft 26. For example, a reduction gear set could be used to translate the force of one or more spiral springs to one or more threaded shafts, so long as they had their axes parallel to the axis of the canister housing 12. However, a single spring, and single shaft coaxial to the cylindrical canister housing, as disclosed, is compact and simple. The spring could be prewound into the pressure plate-thrust collar subassembly before the bottom cover 14 was added. However, using the bottom cover 14 as a spring winder provides a unique cooperation and eliminates components. Therefore, it will be understood that it is not intended to limit the invention to just the embodiment disclosed.

The embodiments of the invention in which an exclusive property or privilege is claimed are defined as follows:

1. In a vehicle fuel vapor storage canister that has canister housing with a central axis and at least one closed end, and in which said housing is substantially filled by a bed of fuel vapor adsorbent material the volume of which, relative to the volume of said housing, is subject to decrease, an improved mechanism for maintaining a loading pressure on said bed within said housing, comprising, an axially movable pressure plate in contact with said adsorbent bed and axially spaced from said closed end, a stationary thrust collar located between said pressure plate and closed end including a threaded journal disposed about a journal axis substantially parallel to said housing axis, a threaded shaft turnable within said journal when sufficient torque is applied about said journal axis so as to apply an axial force to said pressure plate and a loading pressure to said adsorbent bed, and, a wound torsion spring having one end fixed to said housing and another end applied to said threaded shaft through a lever arm sufficient to create said sufficient torque to turn said threaded shaft and move said pressure plate axially into said bed as said relative volume decreases, thereby substantially maintaining said loading pressure.

2. In a vehicle fuel vapor storage canister that has generally cylindrical canister housing with a central axis and at least one closed end, and in which said housing is substantially filled by a bed of fuel vapor adsorbent material the volume of which, relative to the volume of said housing, is subject to decrease, an improved mechanism for maintaining a loading pressure on said bed within said housing, comprising, an axially movable pressure plate in contact with said adsorbent bed and axially spaced from said closed end, a stationary thrust collar located between said pressure plate and closed end including a central threaded journal coaxial to said housing, a threaded shaft turnable within said journal when sufficient torque is applied about said central axis so as to apply an axial force to said pressure plate and a loading pressure to said adsorbent bed, and, a wound torsion spring having one end fixed to said housing and another end applied to said threaded shaft through a lever arm sufficient to create said sufficient torque to turn said threaded shaft and move said pressure plate axially into said bed as said relative volume decreases, thereby substantially maintaining said loading pressure.

3. In a vehicle fuel vapor storage canister that has generally cylindrical canister housing with a central axis and at least one closed end, and in which said housing is substantially filled by a bed of fuel vapor adsorbent material the volume of which, relative to the volume of said housing, is subject to decrease, an improved mechanism for maintaining a loading pressure on said bed within said housing, comprising, an axially movable pressure plate in contact with said adsorbent bed and axially spaced from said closed end, a stationary thrust collar located between said pressure plate and closed end including a central threaded journal coaxial to said housing, a threaded shaft turnable within said journal when sufficient torque is applied about said central axis, said shaft having a coaxial disk thereon located below said thrust collar with a radius larger than said shaft, and, a wound torsion spring having one end fixed to said housing and another end fixed to the edge of said disk so as to apply a spring force through the lever arm of said disk and thereby apply said sufficient torque to turn said threaded shaft within said thrust collar and move said pressure plate axially into said bed as said relative volume decreases, thereby substantially maintaining said loading pressure.

* * * * *